Feb. 14, 1967 — D. G. FAWKES — 3,304,050
VALVE SEAT
Filed April 1, 1963 — 2 Sheets-Sheet 1
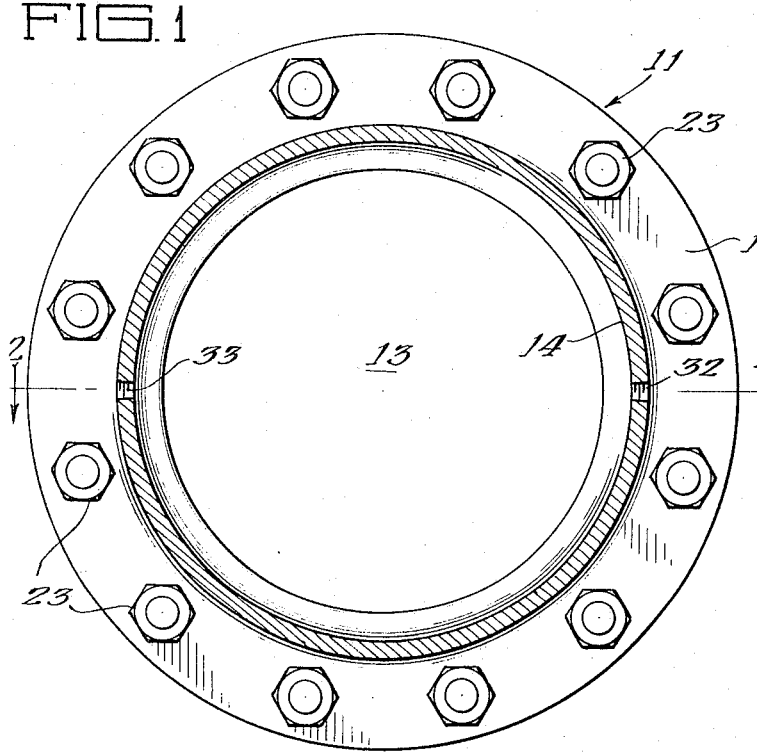
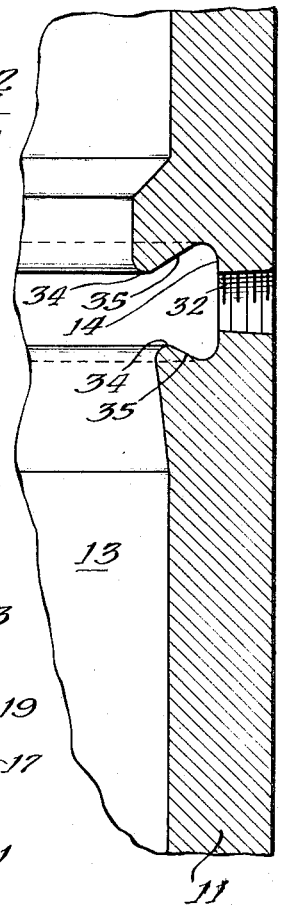
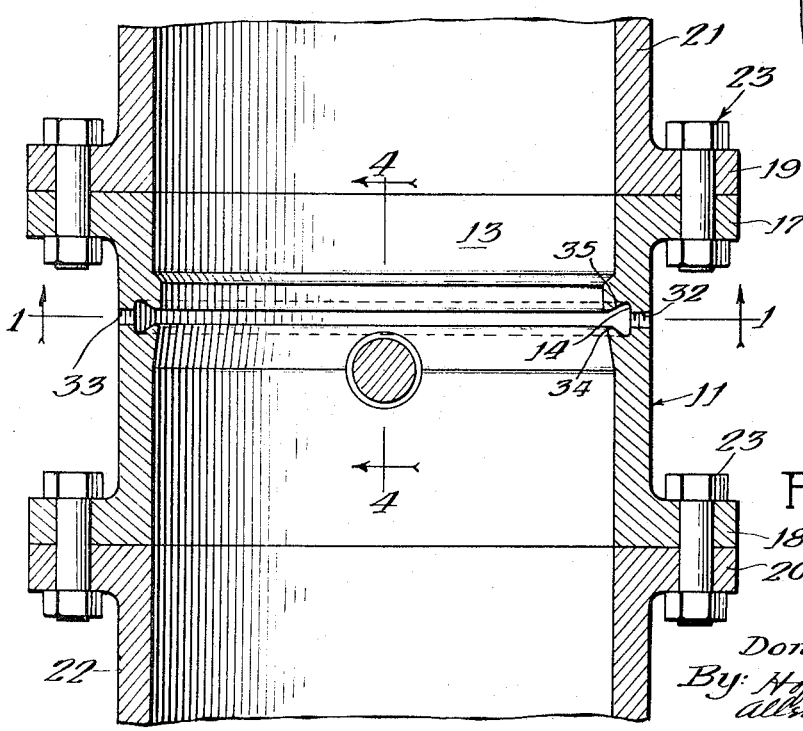
Inventor:
Donald G. Fawkes
By: Hofgren, Wegner,
Allen, Stellman & McCord
Attorneys

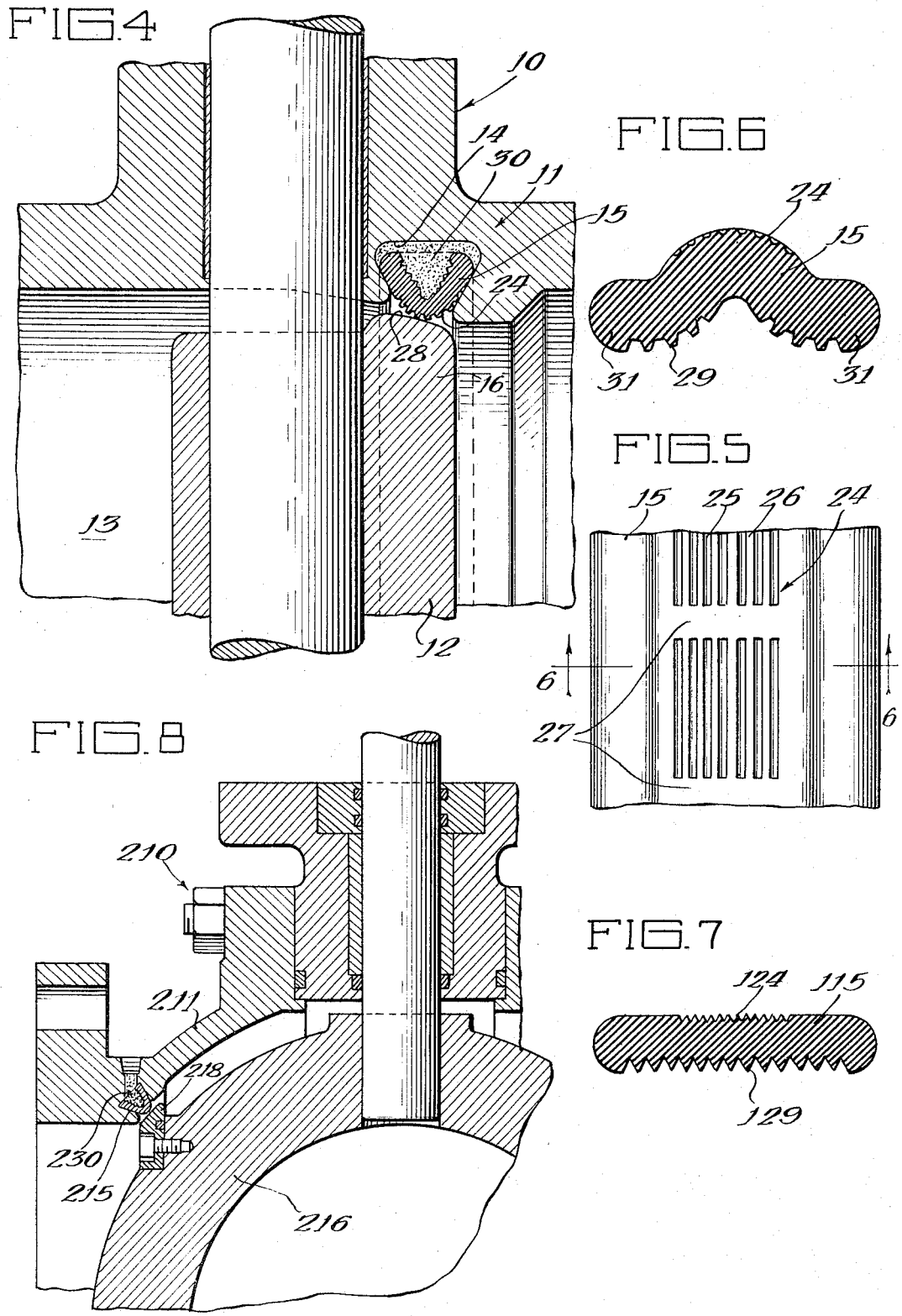

United States Patent Office

3,304,050
Patented Feb. 14, 1967

3,304,050
VALVE SEAT
Donald G. Fawkes, Chicago, Ill., assignor to Henry Pratt Company, a corporation of Illinois
Filed Apr. 1, 1963, Ser. No. 269,527
9 Claims. (Cl. 251—306)

This invention relates to valves and in particular to valve seats for use therein.

In one well known valve construction, a movable valve member is selectively positionable to close an opening between the movable valve member and a surrounding body member. In one form of such a valve commonly called a butterfly valve, a disc is pivoted about a diameter thereof within an annular valve body so that when the flat plane of the disc is aligned with the axis of the annular body flow through the valve is permitted, and when the flat plane of the disc is arranged transversely to the axis of the body flow through the valve is effectively prevented.

In another form of valve, commonly known as a ball valve, the movable valve member comprises a ball rotatable about a diameter thereof so as to selectively dispose a bore through the ball in axial alignment with the axis of the body member in the open position of the valve and transversely thereto in the closed position of the valve. The present invention is concerned with a valve seat construction which may be provided in valves, including such butterfly and ball valves, to provide a tight seal between the valve members for effectively positively precluding leakage of fluid through the valve in the closed position.

Thus, a principal feature of the present invention is the provision of a new and improved valve seat structure.

Another feature of the invention is the provision of such a valve seat structure adapted to be mounted on one of the two relatively movable valve members and having new and improved means for causing the seating surface thereof to have accurate conformity with the other of the valve members in the closed position of the valve.

A further feature of the invention is the provision of such a valve seat structure wherein the valve seat is stressed by means of a set mass of plastic material disposed between the seat member and the valve member on which it is carried to adjust accurately the configuration of the seating surface thereof.

A yet further feature of the invention is the provision of such a valve structure wherein the set mass of plastic material further serves to secure the seat member of the valve member on which it is carried.

Still another feature of the invention is the provision of such a valve structure wherein the seat member is arranged to have limited contact area for improved seating engagement with the other valve member.

Another feature of the invention is the provision of a new and improved method of forming such a valve seat structure.

A further feature of the invention is the provision of such a method of forming a valve seat structure including the steps of providing means defining a channel, disposing a resilient seat member with an inner portion thereof in the channel and an outer portion thereof defining a seating surface exposed to outwardly of the channel, forcing a mass of plastic material into the channel between the inner portion and the channel means to exert a stress on the seat member for selectively accurately adjusting the configuration of the seating surface, and causing the mass of plastic material to set with the seating surface retained in the adjusted configuration.

Other features and advantages of the invention will be apparent from the following description taken in connection with the accompanying drawings wherein:

FIGURE 1 is a transverse section of a butterfly valve body having a channel structure arranged for receiving a valve seat member embodying the invention;

FIGURE 2 is a diametric section thereof taken substantially along the line 2—2 of FIGURE 1;

FIGURE 3 is a fragmentary enlarged section of a portion of the valve as illustrated in FIGURE 2;

FIGURE 4 is an enlarged fragmentary section taken substantially along the line 4—4 of FIGURE 2, but with the disc member and valve seat member as disposed in the closed position of the valve;

FIGURE 5 is an elevation of a portion of the valve seat member showing the seating surface thereof;

FIGURE 6 is a transverse section thereof taken substantially along the line 6—6 of FIGURE 5;

FIGURE 7 is a transverse section illustrating a modified form of valve seat member embodying the invention; and FIGURE 8 is a fragmentary diametric section of a ball valve provided with a seat structure embodying the invention.

In the exemplary embodiment of the invention as disclosed in FIGURES 1 through 6 of the drawing, a fluid flow control valve generally designated 10, herein comprising a butterfly valve, includes an annular valve body generally designated 11 and a disc member generally designated 12 relatively movably associated for selectively opening and closing a passage 13 extending axially through the valve body. In the illustrated embodiment the body is provided with an annular channel 14 opening radially inwardly and receiving a seat member 15 which is engaged by the periphery 16 of the disc 12 in the closed position of the valve for sealingly closing the passage 13 against fluid flow past the disc 12.

In the illustrative embodiment of the invention, the valve body 11 is provided at its opposite ends with outturned flanges 17 and 18 adapted to be sealingly secured to corresponding outturned flanges 19 and 20 of associated conduits 21 and 22, respectively, the flanges being secured to each other by suitable means, such as nut and bolt means 23.

Referring now more specifically to FIGURES 4 through 6, the seat member 15 comprises a resilient member formed of a suitable material such as rubber. The seating surface 24 thereof is provided with a plurality of grooves 25 spaced laterally apart to define a plurality of contact areas 26 therebetween. The grooves are interrupted at spaced intervals to define dams 27 preventing fluid flow from one group of grooves longitudinally to the next. The grooved seating surface 24, as shown in FIGURE 4, has a width greater than the width of the confronting disc edge 28. However, by virtue of the reduced contact area resulting from the provision of the grooves 25 in the seating surface, the torque required to open and close the valve is substantially reduced and herein is substantially one-half that required were the seating surface 24 not provided with the grooves. Further, as the dams 27 preclude fluid flow through the groove portions, the seat member may be skewed to the axis of the valve somewhat without permitting flow of fluid from the upstream side of the valve to the downstream side of the valve. Illustratively, the valve seat may be skewed to an angle up to ±2½ degrees.

The inner surface 29 of the seat member 15 is shown in FIGURE 6 to be grooved for improved gripping coaction with a body 30 of material received in the channel 14 behind the valve seat member 15. The seat member 15 may be formed in a generally U-shaped channel configuration, as shown in FIGURE 6, with outwardly extending flange portions 31. The channel 14, as best seen in FIGURES 3 and 4, is undercut so as to receive the flange portions 31 of the valve seat member therein, the flange portions being urged together during the installation of the seat member in the channel. The seat is preferably sufficiently thick to preclude blow-out thereof between the body member 11 and the surface 28 of the disc 16 as a result of the fluid pressure acting against the valve seat in the space between the body member and disc surface 28.

The invention comprehends an improved seat structure wherein the body 30 of material behind the valve seat is caused to stress selectively the valve seat for adjusting the configuration of seating surface 24 to accurately conform to the disc surface 28. In such valves a problem arises in accurately conforming the disc and seat structures so as to make the valve absolutely bubble-tight. In the present invention this conformity is effected by means of the body 30 which urges the resilient valve seat member 15 into positive tight engagement with the disc surface 28 along the entire extent thereof.

More specifically, body 30 comprises a set mass of plastic material which is introduced into the channel 14 behind the valve seat member 15 through a suitable inlet such as inlet 32, as shown in FIGURE 2. The plastic material is caused to flow in each of the semi-annular channel sections leading from the inlet 32 to the diametrically opposite side of the valve wherein is provided an outlet 33 permitting a small amount of the plastic material to pass outwardly therefrom, and thereby indicating that the channel has been completely filled with plastic material. The outlet may then be closed and pressure applied to the plastic material through the inlet so as to cause the rubber seat member 15 to be stressed outwardly into engagement with the disc surface 28 which is disposed at this time in the closed position, as shown in FIGURE 6. The valve seat 15 may be originally disposed in the channel with its seating surface 24 spaced from the disc surface 28 a preselected distance, such as $\frac{1}{16}$ inch. Thus, the fluid pressure acting through the plastic material 30 firstly urges the entire seat member 15 through the $\frac{1}{16}$ inch gap into engagement with the disc surface. The pressure causes the seating surface to be forced against the disc surface 28, notwithstanding the fact that the disc surface 28 may not be truly circular, and may have irregularities therein. Thus, the seating surface is caused to conform to the irregularities and provide a perfect seal with the surface 28 along its entire annular extent.

The plastic material is then allowed to set in the channel 14 while the pressure thereon is maintained. Once the plastic body 30 has set, the force of fluid pressure may be removed. The disc 16 may then be selectively moved to the open position and returned to the closed position as desired, with the disc surface 28 being tightly sealed to the seat member surface 24 each time the disc is returned to the closed position as the set body 30 maintains the seat with its seating surface 24 adjusted to the configuration in which it was disposed during the setting of the plastic body 30.

The plastic body 30 illustratively may be formed of an epoxy resin capable of use at the highest temperatures at which the rubber seat member 15 may be used. Another example of a material which may be used for the plastic body 30 is polyurethane foam material. The pressure applied to the plastic material should be sufficient to cause the desired accurate conformity of the seating surface 24 with the disc surface 28 and obviously is a function of the durometer characteristic of the seat member and the pressure at which the valve is intended to function.

The plastic body 30 further serves, as indicated briefly above, to retain the seat member 15 within the channel 14 as a result of its secured engagement with the rear surface portion 29 of the seat member. Further, the pressure induced in the plastic material serves to press the flanges 31 of the seat member firmly against the body member 11 in the outer portion of the channel 14 further securing the seat member in the channel.

As best seen in FIGURE 3, the outer edges 34 of the channel 14 are rounded to preclude undesirable deformation of the seat member when pressed thereagainst as by fluid forces. The side walls 35 of the channel 14 are generally frusto-conical and taper toward the axis of the valve at an angle of approximately 30° to a radial plane. Thus, the seat member 15 may be retained positively within the channel against the side surfaces 35 of the channel.

As the seat member 15 is adjusted relative to the disc surface 28 by means of the plastic body 30, it is unnecessary to accurately machine the channel 14 therein. Thus, the channel may be formed by simple and economical means, such as by forming the channel in the valve body during casting of the valve body.

The invention further comprehends an arrangement wherein the seat member 15 is not bonded to the set body 30. For this purpose, a suitable release agent may be applied on the rear surface 29 of the seat member. Where the rear surface 29 of the seat member is not bonded to the plastic body 30, additional material may be subsequently inserted into the cavity 14 as by introduction thereof through a hypodermic-type needle inserted through the rubber seat member 15. Such a method of introducing the plastic material to behind the seat member may be employed, for example, in the field such as in maintaining the valve where wear of the seat member occurs requiring a subsequent restressing of the seat member into sealed engagement with the disc surface 28.

Referring now to FIGURE 7, a modified form of seat member 115 is shown to comprise a seat member generally similar to seat member 15 but having a generally flat section rather than the U-shaped section of seat member 15. The seat member 115 is provided with a seating surface 124 and a rear surface 129 generally similar to and functioning in a similar manner as the seating surface 24 and the rear surface 29 of the seat member 15. The seat member 115 may be used in lieu of the seat member 15, as illustrated in FIGURES 1 through 6.

Referring now to FIGURE 8, a valve seat member generally designated 215, similar to valve seat member 15, is disposed in the body portion 211 of a ball valve generally designated 210 for cooperation with a sealing ring 218 carried on the ball 216 of the valve. A set mass of plastic material 230 is provided behind the seat member 215 and functions in a similar manner to the set mass 30 of valve 10 to provide accurate adjustment of the seat member to the sealing ring 218 along its entire annular extent.

Thus, the invention comprehends an improved valve seat structure wherein the seat member is caused to have accurate conformity with the valve member seating thereagainst for improved bubble-tight closure of the valve.

The adjustment of the seat member with the surface to have such accurate conformity is effected in a novel and simple manner by means of forces originally applied in a hydraulic manner and which are subsequently positively maintained by the setting of the fluid medium through which they act. Thus, the invention comprehends a simple and economical structure providing long trouble-free valve life and assuring optimum leakproof operation thereof.

While I have shown and described certain embodiments of my invention, it is to be understood that it is capable of many modifications. Changes, therefore, in the construction and arrangement may be made without departing from the spirit and scope of the invention as defined in the appended claims.

I claim:

1. Structure for sealing a first valve member to an adjacent sealing surface of a second valve member, comprising: means on the first valve member defining a channel having side walls, an opening confronting said sealing surface of the second valve member, and a bottom surface; a seal on said first member in adjusted fixed position formed of a resiliently distortable material having an inner portion disposed in contact with said side walls, and an outer portion in contact with said sealing surface, said seal having a configuration permitting movement of the entire seal bodily relative to said channel to said adjusted position; and a set mass of plastic material in the channel between said seal and said bottom surface bodily positioning the seal to engage said sealing surface and compressing the seal against said sealing surface to have uniform sealing engagement therewith, said seal being confined only by said sealing surface, said side walls of said channel means and said set mass, the outer surface of said set mass behind said outer portion of the seal being spaced from said sealing surface at each point along the channel a distance equal to the thickness of the uncompressed seal between said outer surface of the set mass and said sealing surface minus a preselected dimension thereby providing a uniform compression of said outer portion of said seal at each said point.

2. The structure of claim 1 including means for providing relative movement between said first and second valve members.

3. The structure of claim 1 wherein said inner portion of the seal is provided with gripping means in locked engagement with said set mass.

4. The structure of claim 1 wherein said outer portion of the seal including alternating projecting and recessed surface portions providing a reduced contact area in seating engagement with said second member.

5. The structure of claim 1 wherein said set plastic material comprises an epoxy resin.

6. The structure of claim 1 wherein said seal is bonded to said set plastic mass.

7. The structure of claim 1 including means mechanically interlocking said seal to said set plastic mass.

8. The structure of claim 1 wherein said channel comprises an annular channel and said seal comprises an annular element.

9. The structure of claim 1 wherein said channel side walls diverge toward said bottom surface.

References Cited by the Examiner

UNITED STATES PATENTS

| | | | |
|---|---|---|---|
| 1,844,641 | 2/1932 | DeWein | 251—173 |
| 2,099,722 | 11/1937 | Byers | 277—34 X |
| 2,306,160 | 12/1942 | Freyssinet | 277—34 |
| 2,918,089 | 12/1959 | McFarland | 251—331 X |
| 3,076,631 | 2/1963 | Grove | 251—173 |
| 3,119,593 | 1/1964 | Fawacki et al. | 251—171 |
| 3,206,530 | 9/1965 | Boteler | 251—368 X |
| 3,216,695 | 11/1965 | Bartholet | 251—173 |

FOREIGN PATENTS 436,294   8/1935   Great Britain.

M. CARY NELSON, *Primary Examiner.*

L. D. KAMPSCHROR, *Assistant Examiner.*